UNITED STATES PATENT OFFICE.

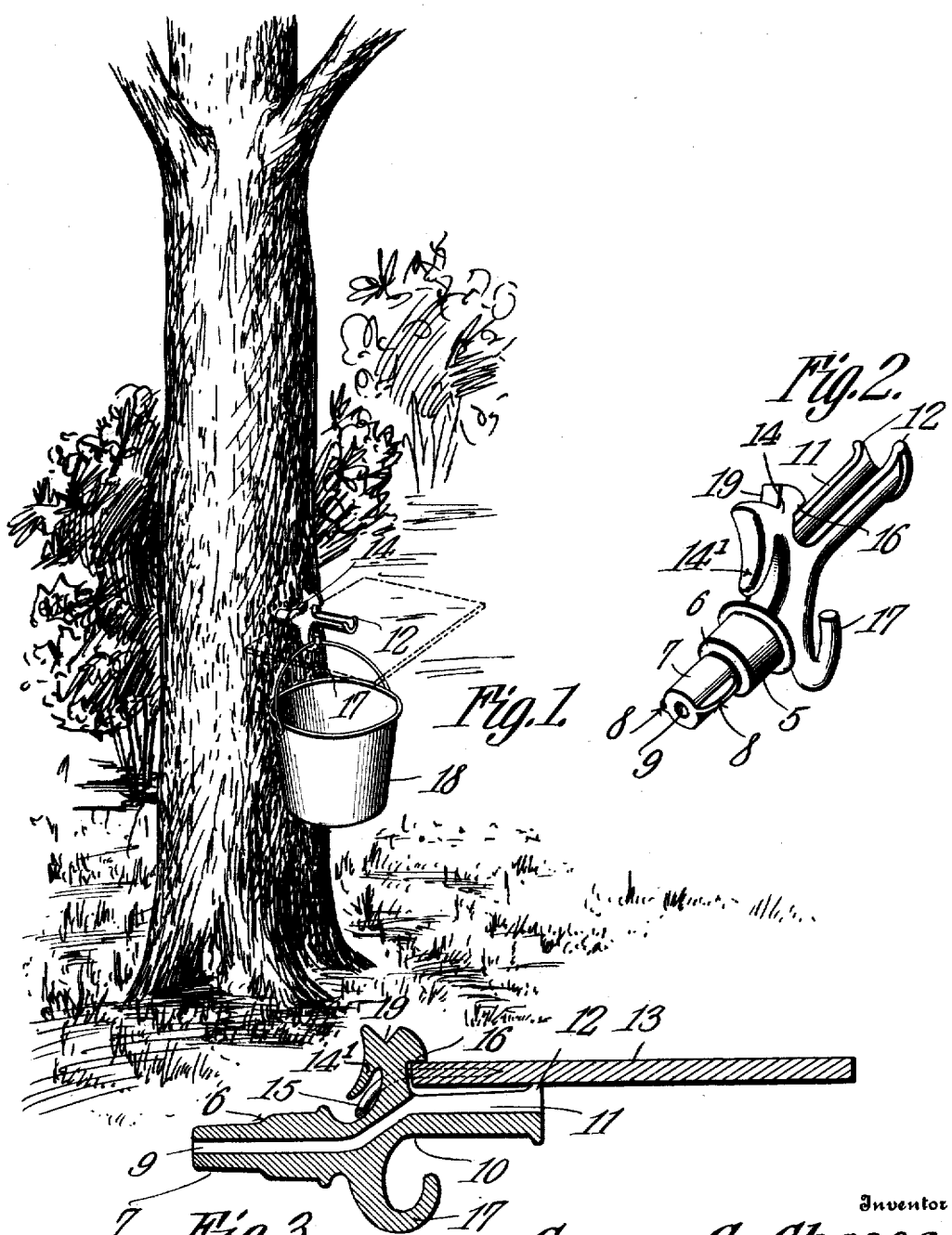

GEORGE G. CHASSE, OF NORTH CRAFTSBURY, VERMONT.

SAP-SPOUT.

No. 908,744.   Specification of Letters Patent.   Patented Jan. 5, 1909.

Application filed August 24, 1908. Serial No. 450,003.

*To all whom it may concern:*

Be it known that I, GEORGE G. CHASSE, a citizen of the United States, residing at North Craftsbury, in the county of Orleans and State of Vermont, have invented a new and useful Sap-Spout, of which the following is a specification.

This invention relates to sap spouts for conducting sap from maple trees, and directing the same into a suitable receptacle, to be converted into maple syrup or sugar.

The object of the invention is to provide a sap spout having an off-set portion, so that the discharge-end of the spout will be disposed in a plane above the inlet, thus keeping the inlet full of sap and preventing the wind and air from drying the sap in the opening in the tree, and clogging, or otherwise obstructing, the discharge passage.

A further object is to provide a sap spout having its upper portion cut away, so as to expose the sap in the discharge passage, there being vertical lugs disposed on opposite sides of the discharge passage for supporting the cover in spaced relation thereto.

A further object of the invention is to provide improved means for retaining the cover in position on the spout, and means for supporting said cover in elevated position when cleaning the spout or removing the sap-receiving bucket.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

In the accompanying drawings forming a part of this specification:—Figure 1 is a perspective view of a sap spout constructed in accordance with my invention showing the same in position on a tree. Fig. 2 is a perspective view of the sap spout detached. Fig. 3 is a longitudinal sectional view.

Similar numerals of reference indicate corresponding parts in all of the figures of the drawings.

The device comprises a substantially cylindrical body portion 5 having an annular shoulder 6 defining a reduced extension 7 adapted to be inserted in an opening in the tree, there being laterally extending wings or blades 8 formed on the extension 7 for engagement with the walls of said opening, thereby to assist in preventing accidental displacement of the sap spout.

The spout is provided with a longitudinally disposed passage 9 the discharge end of which is disposed in a plane above the inlet so as to allow the sap to accumulate at the off-set portion 10 of the passage and thus prevent the wind and air from drying the sap and clogging or otherwise obstructing said discharge passage.

The upper portion of the spout at the discharge end thereof is cut away at 11 so as to expose a portion of the contents of the spout, there being spaced lugs 12 extending vertically from the cut away portion of the spout at the discharge end thereof for engagement with a cover 13. The lugs 12 serve to space the lower surface of the cover 13 from the cut away portion of the spout so as to prevent the sap from adhering to the cover and thence dropping to the ground.

Extending vertically from the off set portion 10 of the spout is an over-hanging hook 14 the bill 14' of which is disposed above the bail 15 of the cover and assists in preventing accidental displacement of said cover.

A square shoulder 16 is formed on one side of the hook 14 for engagement with the upper surface of the cover, said shoulder forming a stop to limit the upward movement of the rear end of the cover when a downward pressure is exerted on the front end thereof.

Depending from the intermediate portion of the spout and preferably formed integral therewith is a hook 17 from which is suspended a bucket 18 adapted to receive the sap from the discharge end of the passage 9, said bucket being effectually housed and protected by the cover or plate 13.

The top of the hook 14 is formed with a substantially V shaped notch 19 arranged to receive the rear edge of the plate or cover 13, thereby to support said cover in elevated position so as to expose the sap in the discharge passage at the cut away portion of the spout when it is desired to clean the spout or detach the bucket from the hook 17.

It will thus be seen that the sap is free to flow from the tree through the passage 9 into the bucket 18, the off-set portion 10 of the passage serving to keep the inlet end of the spout full of sap and thus prevent drying of the sap at the opening in the tree. It will also be noted that by having the cover 13 extended longitudinally beyond the adjacent end of the discharge spout the weight of said cover on the lugs 12 will force the rear end of the cover in engagement with the stop shoulder 16 thus maintaining the cover in spaced relation to the upper edge of the spout and at the same time effectually preventing accidental displacement of said cover.

From the foregoing description it will be seen that there is provided an extremely simple, inexpensive and efficient device admirably adapted for the attainment of the ends in view.

Having thus described the invention what is claimed is:—

1. A sap spout provided with an intermediate off set portion and having its discharge end disposed in the plane above the inlet, an over-hanging hook extending upwardly from the off set portion of the spout, lugs carried by the discharge end of the spout, and a cover resting on the lugs and provided with a bail for engagement with the over-hanging hook, there being a recess formed in the top of the over-hanging hook and adapted to receive one edge of the cover for supporting said cover in inoperative position.

2. A sap spout having a discharge passage and provided with an over-hanging hook, there being a shoulder formed in that side of the hook opposite the bill thereof, lugs extending vertically from the sap spout at the discharge end of the latter, and a cover resting on the lugs and having its rear edge bearing against said shoulder.

3. A sap spout provided with a longitudinal discharge passage and having its discharge end disposed above the inlet, a portion of the spout being cut away to partially expose the discharge passage, an over-hanging hook having a shoulder formed in one side thereof, lugs extending vertically from the spout, a cover resting on the lugs and bearing against the shoulder, a bail carried by the cover and engaging the over-hanging hook, there being a recess formed in the top of the hook and arranged to receive one edge of the cover for supporting the latter in inoperative position.

4. A sap spout provided with a longitudinal passage and having its discharge end disposed in a plane above the inlet, a portion of the spout at the discharge end thereof being cut away, a hook depending from the spout and arranged to support a containing vessel, an over-hanging hook extending upwardly from the spout and having one side thereof provided with a shoulder, lugs secured to the discharge end of the spout, a cover resting on said lugs and bearing against the shoulder, and a bail carried by the cover and engaging the over-hanging hook.

5. A sap spout comprising a body portion having a circumferential shoulder and defining a reduced extension, said sap spout being provided with a passage and having its discharge end cut away and disposed in a plane above the inlet of the spout, a hook depending from the intermediate portion of the spout, an over-hanging hook extending vertically from said spout and having a shoulder formed in one side thereof, lugs projecting from the spout, a cover resting on the lugs and bearing against the shoulder, a bail carried by the cover for engaging the over-hanging hook, and attaching wings extending laterally from the reduced extension of said spout.

In testimony that I claim the foregoing as my own, I have hereto affixed my signature in the presence of two witnesses.

GEORGE G. CHASSE.

Witnesses:
　JOSEPH MULLANEY,
　DELPHIS CHASSÉ.